(12) United States Patent  
Lundstrom

(10) Patent No.: US 6,751,060 B2  
(45) Date of Patent: Jun. 15, 2004

(54) MAGNETIC MEDIA WITH READABLE TOPOGRAPHICAL FEATURES

(75) Inventor: Garry R. Lundstrom, Forest Lake, MN (US)

(73) Assignee: Imation Corp., Oakdale, MN (US)

( * ) Notice: Subject to any disclaimer, the term of this patent is extended or adjusted under 35 U.S.C. 154(b) by 232 days.

(21) Appl. No.: 09/730,106

(22) Filed: Dec. 5, 2000

(65) Prior Publication Data

US 2002/0068195 A1 Jun. 6, 2002

(51) Int. Cl.[7] .............................. G11B 5/82; G11B 5/64
(52) U.S. Cl. .................................................. 360/135
(58) Field of Search .......................................... 360/135

(56) References Cited

U.S. PATENT DOCUMENTS

| 4,303,806 A | 12/1981 | Thiele |
| 4,519,065 A | 5/1985 | Lewis et al. |
| 4,719,615 A | 1/1988 | Feyrer et al. |
| 5,535,190 A | 7/1996 | Moore et al. |
| 5,576,918 A | 11/1996 | Bar-Gadda et al. |
| 5,626,941 A | 5/1997 | Ouano |
| 5,723,033 A | 3/1998 | Weiss |
| 5,739,972 A | 4/1998 | Smith et al. |
| 5,751,510 A | 5/1998 | Smith et al. |
| 5,768,075 A | * 6/1998 | Bar-Gadda .................. 360/135 |
| 5,872,676 A | 2/1999 | Smith et al. |
| 6,068,891 A | * 5/2000 | O'Dell et al. ............... 360/135 |
| 6,088,176 A | 7/2000 | Smith et al. |
| 6,440,520 B1 | * 8/2002 | Baglin et al. ......... 428/694 TR |

FOREIGN PATENT DOCUMENTS

WO    WO 00/48172    8/2000

\* cited by examiner

*Primary Examiner*—Craig A. Renner  
(74) *Attorney, Agent, or Firm*—Eric D. Levinson

(57) ABSTRACT

Magnetic patterned media comprise topographical features readable with a slider-mounted non-magnetic transducer sensitive primarily to a local aerodynamic boundary condition, in addition to a magnetic recording layer substantially conforming to the topographical features. Passage of a transducer over the features generates effects that can be detected in, and separated from, the magnetic recording signal.

10 Claims, 5 Drawing Sheets

MAGNETIC MEDIA WITH READABLE TOPOGRAPHICAL FEATURES

FIELD OF THE INVENTION

This invention concerns ma c recording media having topographical features detectable by slider-mounted transducers sensitive primarily to local aerodynamic boundary conditions.

BACKGROUND OF THE INVENTION

To meet the insatiable demand for inexpensive and inexhaustible data storage, the long and steady march of progress in the field of data recording and electronic playback has relied on many technical approaches. No approach has outperformed the versatility and extremely high storage densities of magnetic recording, in which a signal is recorded by selectively varying the magnetic moments of physical regions of media such as flexible tapes or rigid (typically rotating) disks. Another broad class of approaches relies on variations in the physical shape of the surface of the media. Such features are not detected directly, but rather are used to cause corresponding variations in characteristics such as reflectivity, coercivity, and the like that may be detected accordingly (e.g., an optical detection system, in the case of variations in reflectivity).

SUMMARY OF THE INVENTION

One aspect of the invention is a magnetic recording medium. The medium has a substrate having topographical features, and a magnetic recording layer substantially conforming to the topographical features. The features affect local aerodynamic boundary conditions between the recording medium and a slider-mounted non-magnetic transducer passing over the medium, which may be detectable by the transducer to playback the data encoded in the topographical features. The topographical features may lie below the height at which a magnetic transducer would interact with the magnetic recording layer. The local aerodynamic boundary conditions may be affected by temperature or pressure. Another aspect of the invention includes a separate transducer for playing back any other data that may be recorded in the magnetic recording layer.

BRIEF DESCRIPTION OF THE DRAWINGS

The accompanying drawings show a particular embodiment of the invention as an example, and are not intended to limit the scope of the invention.

DETAILED DESCRIPTION

In general terms, the invention includes a system capable of playing back machine readable data represented in patterned features in a magnetic recording medium. The playback technique relies on the topography of the features and not on the composition (or other composition-dependent properties) of the material from which the features are formed. Thus, there are two types of data that may be played back the data encoded in the patterned features and the data magnetically recorded in the medium. For the first type of data, the system includes a slider-mounted non-magnetic transducer sensitive primarily to local aerodynamic boundary conditions. Local aerodynamic boundary conditions are defied by the relative surfaces of the slider, the transducer, and the recording medium. They produce effects that are not electrical, magnetic, optical or otherwise used in known data recording systems. The transducer is connected in any convenient manner to appropriate circuitry that can process the transducer signal as required. The exact nature of these connections and circuitry are not critical to the scope of the invention.

Figure 1:
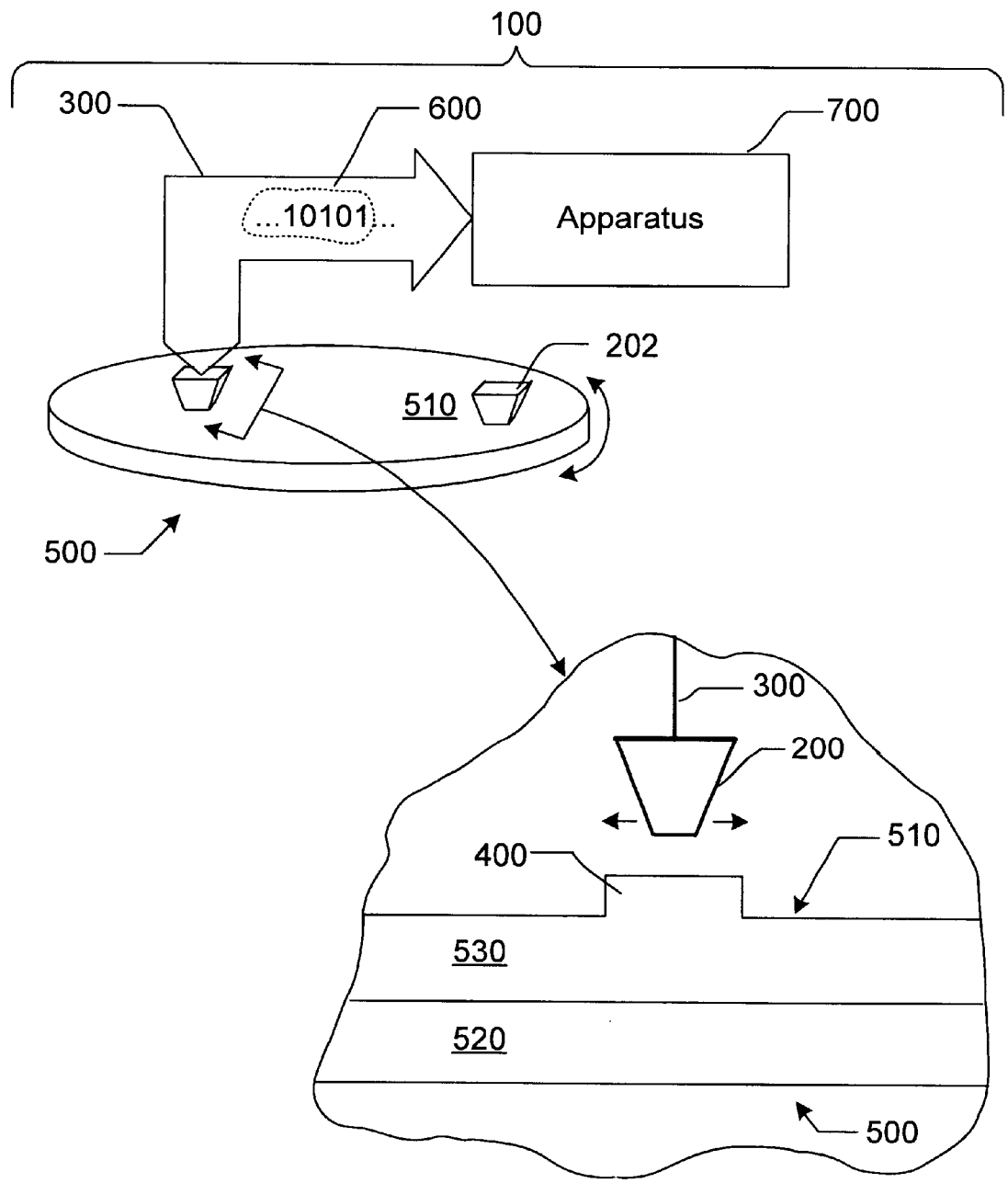
FIG. 1 is a schematic view of a patterned media system.

FIG. 1 is a general schematic diagram of a data storage system 100. In general terms, the invention includes various embodiments of non-magnetic playback transducers 200 that create a signal 300 representative of topographical features 400 present in the suttee 510 of a patterned medium 500. (In this and all embodiments of the invention, patterned medium 500 may be removable from the remainder of the system, in accordance with known principles that do not limit the scope of the invention in any manner.) The scope of the invention includes both topographical features 400 which extend above the suite of recording medium 500 (including but not limited to "bumps") and those that extend below the surface of recording medium 500 (including but not limited to "depressions" or "pits").

In a typical embodiment of the invention, recording medium 500 ranges from 0.3 to 2.0 millimeter in thickness (neglecting topographical features 400). Topographical features 400 generally extend between 5 and 50 nanometer in height above the remainder of the ace of recording medium 500, although heights up to 100 nanometer are possible. When topographical features 400 extend below the remainder of the surface of recording medium 500, they generally do so to a depth of 20 to 150 nanometer.

The shape of topographical features 400, both in cross-section and as viewed from above recording medium 500, is arbitrary. When viewed from above, topographical features 400 generally have an area of less than 50,000 square nanometer. The size and separation of individual topographical features 400 are related to the bulk size and storage capacity of recording medium 500. For example, a series of topographical features 400 having a center-to-center separation of 0.2 micron along the direction of playback (the so-called "bit pitch" in the "down-track" dimension), and center-to-center separations of 0.4 micron in the radial direction between such series (the sled "track pitch"), would yield approximately 15 gigabytes of data on a 120 millimeter diameter disk.

Regardless of the shape of the physical features or how they are formed, the data 600 has been represented as variations in the physical features 400 on the recording medium 500. (Typically the variations represent digital data, i.e., presence of a variation is "on" and absence of a variations is "off" or vice versa.) Transducer 200 senses physical features 400 and produces a signal 300 that represents the data 600 recorded on the medium 500. The transducer 200 is connected in any convenient manner (usually an electrical or electronic connection) to appropriate apparatus (typically electronic circuitry) 700 that can process the transducer signal 300 as required.

As the slider-mounted transducer lies over the recording medium, the topography of the recording medium creates detectable effects due to the local aerodynamic boundary conditions defined by the substrate and the slider upon which the transducer is mounted. The transducer thus produces a signal representative of such effects, and therefore data may be encoded into the recording medium for playback by the transducer by intentionally arranging such features of the recording medium to represent the data into a so-called "machine readable" form.

One type of local aerodynamic boundary condition that may be affected is an atmospheric condition, including (but not limited to) temperature and pressure. Either a pressure sensitive transducer or a temperature sensitive transducer can therefore be used.

One advantage of the invention is that the data signal is determined by the topography of the medium and not the chemical composition, electromagnetic interaction, or optical properties of the active recording layer.

Another advantage of the invention is that the data signal is not generated by effects ultimately caused by contact between the transducer and the medium, such as the vibrations of a phonograph needle that are caused by continuous contact between the needle and the sides of a groove on a phonograph record. Similarly, the data signal is not generated by deflections of the transducer as it interacts with the topographical features. This is in contrast to techniques such as atomic force microscopy (AFM) recording, which measures deflections of (or forces acting on) a stylus due to contact. Nor does the invention rely on the piezoelectric effect. Nor does the invention rely in any manner on deflection or deformation of the topographical features of the media.

The data playback process just described does not involve any magnetic recording principles at all. The invention does, however, additionally include magnetic data recording and playback, using conventional magnetic coating 530 substantially conforming to topographical features 400, and an appropriate transducer 202 Magnetic transducer 202 senses magnetization patterns in magnetic coating 530 and produces a signal that represents the data magnetically recorded in it. Magnetic transducer 202 is connected in any convenient manner (usually an electrical or electronic connection) to appropriate circuitry that can process the transducer signal as required.

Figure 2:
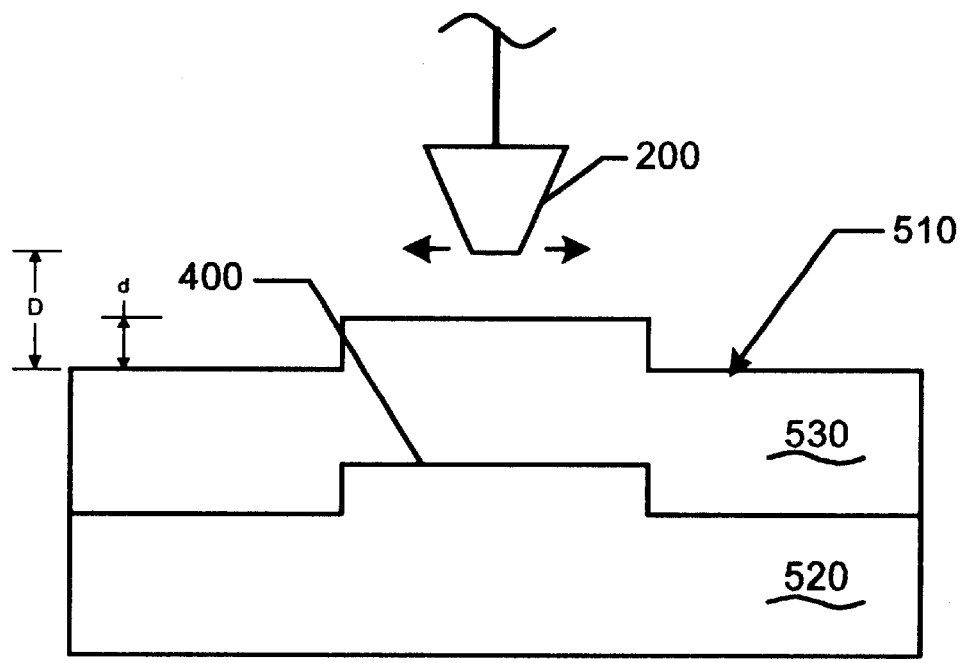
FIGS. 2 and 3 are schematic views of the recording medium of FIG. 1.

FIG. 2 is a schematic cross section of medium 500. Feature 400 extends above the surface of substrate 520 by an amount, d, that is significantly less than the average distance, or "fly height," D, of transducer 200 above surface 510 of medium 500.

Maintaining d less than D ensures that transducer 200 will not be affected with respect to its magnetic interaction with magnetic material 530. Thus, a suitable (but not required) value for D is the range of 25–75 nanometer (1–3 microinch), and a possible (but not required) range of d is 1–25 nanometer, even about 15 nanometer (for example). This can be contrasted to conventional magnetic hard disk drives, in which typical fly heights are 25 nanometer or less.

Figure 3:
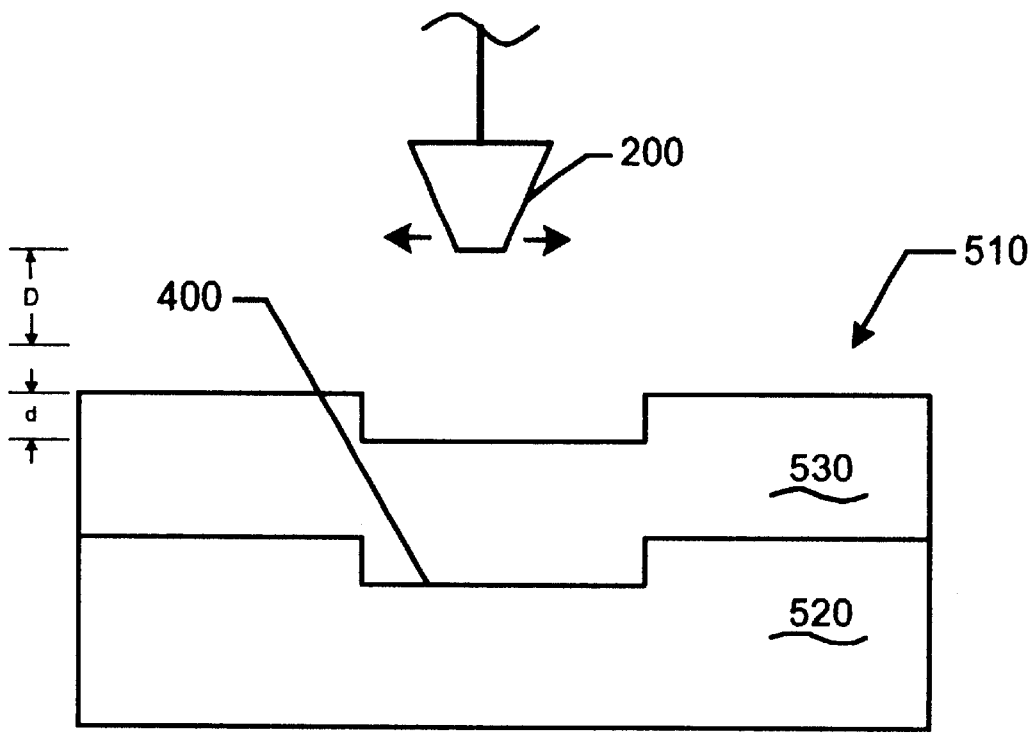

FIG. 3 is similar to FIG. 2 but illustrates a feature 400 in the form of depression or pit in surface 510. In this case, feature 400 should be sufficiently deep for there to be a corresponding feature in surface 510. That is, the process of coating, depositing, or otherwise placing magnetic material 530 on substrate 520 cannot fill in feature 400 so much that it cannot be detected by transducer 200.

Figure 4:
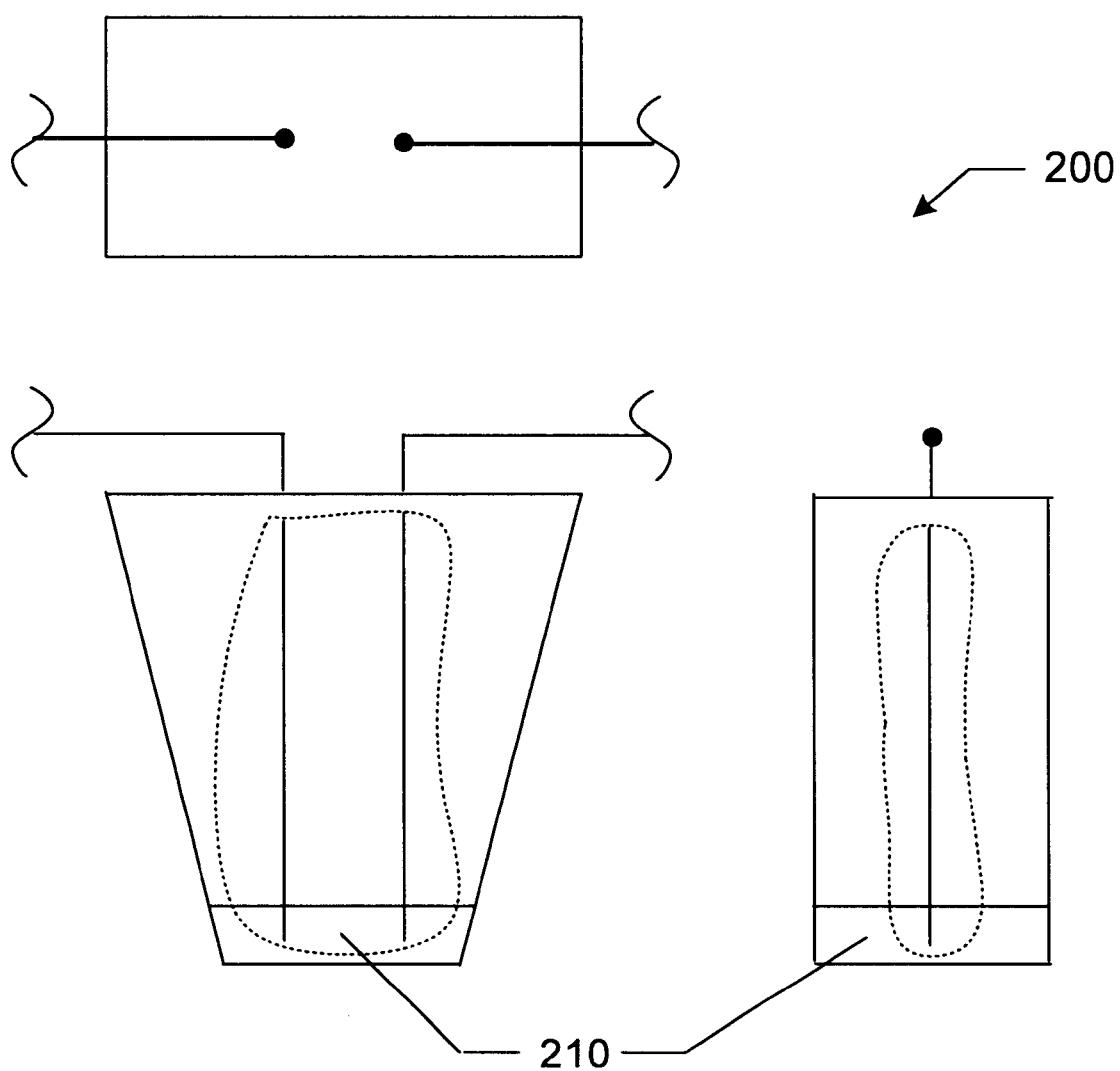
FIG. 4 is a schematic view of the transducer of FIG. 1.

FIG. 4 is a schematic view of transducer 200. Transducer 200 comprises a local aerodynamic boundary condition sensor 210 that provides a signal (typically an electrical signal) indicative of local aerodynamic boundary conditions caused by the features of the recording medium. One broad class of local aerodynamic boundary condition sensor 210 included in the scope of this embodiment is a pressure sensor, and another broad class of local aerodynamic boundary condition sensor 210 included in the scope of this embodiment is a temperature sensor.

The specific design of transducer 200 is not critical to the scope of this invention. Additional details of suitable yet optional embodiments of transducer 200 may be found in U.S. patent application Ser. Nos. 09/130,242, entitled "Patterned Media System" and 09/730,103, entitled "Temperature Sensitive Patterned Media Transducers." As noted in those applications, transducer 200 may include a magnetoresistive (MR) or giant magnetoresistive (GMR) element. If so, the thermally responsive component of the signal can be detected and processed using conventional methods, an example of which is taught in U.S. Pat. No. 6,088,176 (Smith a at), the contents of which are incorporated here by reference.

Figure 5:
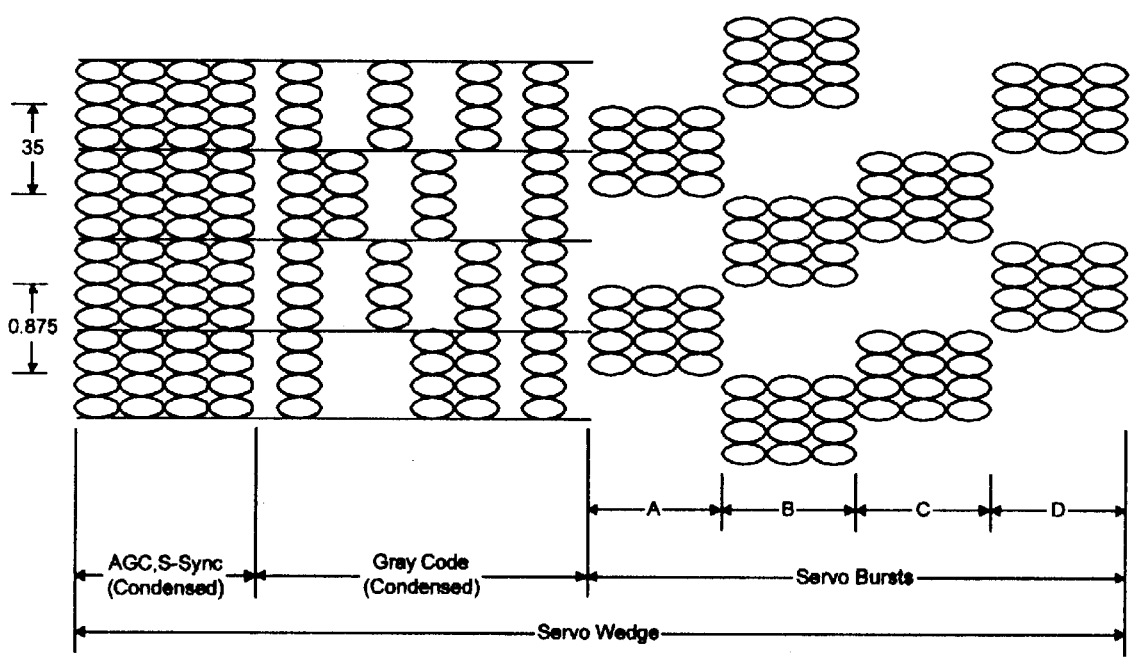
FIG. 5 is a schematic view of a data format.

FIG. 5 is a schematic illustration of a data format, specifically a non-volatile servo format. Each ellipse represents a bump on, or a pit in, the surface of a substrate. The format assumes that a transducer travels from left to right with respect to the frame of reference of the Figure (i.e., the transducer and subtrate could both be moving relative to each other) Thus, it is the down-track dimension of the feature (ie., the m axis of the ellipse) that determines the signal sensed by the transducer as it passes over feature after feature along the track direction. This dimension could be on the order of 218 nanometer, but this is only an example for purposes of illustration.

In the example of FIG. 5, four rows of features as taken in the radial direction represent one servo track width; as illustrated, the track pitch is approximately 0.875 micrometer (35 microinch), which produces approximately 11,400 tracks per centimeter (approximately 28,600 tracks per inch). The number of rows of features is not critical to the scope of the invention. Thus, by using eight rows of features, the track pitch could be doubled (track density halved), and by using only two rows of features, the track pitch could be halved (track density doubled). It is assumed for purposes of illustration, but not a requirement of the invention, that the width of the transducer is the same as the width of a single track.

As indicated in FIG. 5, a region of data ("servo wedge") comprises several subregions, the data in each of which being dedicated to a specific purpose. In one subregion, the data represents signals such as automatic gain control (AGC), conventional S-Sync and the like; in another subregion, condensed Gray Code data; in a third subregion, servo burst signals. The type of signal represented by the data is not critical to the scope of the invention, nor is the number or arrangement of types of data signals.

The feature may any shape in cross section, and not just the oval shape shown for purposes of illustration. It may be detected using either edge detection or peak detection techniques, depending on the type of transducer and/or signal processing circuitry employed. For example, one possible type of transducer responds to the temperature effects related to air compression as the transducer surface encounters a leading or trailing edge of a feature. Thus, an edge detection method similar to the tangential push-pull detection method used in the commercially available Digital Versatile Disk (DVD) format may be employed. One specific type of thermal sensing transducer is a magnetoresistive or giant-magnetoresistive transducer which is used to detect change in resistance as a function of change in temperature, as opposed to its conventional use to detect change in resistance as a function of change in magnetization. The direct current (DC) transducer output may be differentiated to produce a signal having similar recording densities as the DVD format, assuming the feature dimensions are the same, i.e., at least 400 nanometer in dimension as required by the known DVD specification. As noted above, the scope of the invention is not limited to these feature dimensions and/or recording densities.

In general, peak detection schemes produce only half the data density of edge detection schemes, because a single feature has two edges (leading and trailing) but only one peak or plateau. However, peak detection schemes are easier to implement in circuitry and/or software. Thus, features slightly less than 200 nanometer (to provide some margin for error in the detection scheme) could generate recording densities similar to the DVD format if a peak detection scheme were employed, or twice the DVD format if the more complicated edge detection schemes were employed. Even smaller features could be resolved if some type of error correction scheme were added to account for the increased difficulty of accurately resolving smaller features. For example, the Partial-Response, Maximum-Likelihood (PRML) techniques commonly used in magnetic hard disk drives are suitable for use with the invention, taking into account whatever minor changes would be desired by one skilled in the art once informed of this invention.

EXAMPLE

A polycarbonate substrate was molded from a glass master using a 16 nanometer layer of photoresist to produce a pattern of features, each 16 nanometer in height. The substrate was otherwise typical of and suitable for use as, a substrate for a magnetic recording medium, but a layer of magnetic material was not added solely for demonstration purposes. The substrate was tested with a conventional flying giant magnetoresistive (GMR) head at a fly height of 25 nanometer, located at a radius of 36 millimeter above the substrate, which was rotated at 4000 revolutions per minute. A bias current of 2 milliampere was applied to the GMR head. The patterned feature produced a signal of approximately 700 millivolt, well above background noise levels. A similar experiment considered signals detected from similarly sized pits in a substrate, and concluded that bumps were more readable than pits.

Possible uses of the physical features of the invention include any (or any combination of): non-volatile servo information for positioning the magnetic head (or heads) along a track; automatic gain control (AGC) data; timing or location synchronization; encoding information for any purpose, such as error detection/correction codes, Gray codes, servo bursts, and the like; product identification data such as manufacturing information, authentication information, encryption codes or keys (public or private); customer identification in the case of custom products; "embedded applications" such as operating systems, application programs, and the like; water ng and similar data related to the authenticity or uniqueness of any data; and patent and copyright notices.

In all embodiments of the invention, term "topographical features" should be understood in its broadest sense within the operating principles of the invention, and therefore the term is considered to include features such as bumps, pits, lands, valleys, rails, grooves, channels, ridges, and so on. Similarly, while a single topographical feature is illustrated and described, this is only for clarity and therefore the invention includes (or is equilavent to) embodiments in which more and one type or shape of topographical feature is present. Nor is the invention limited in any manner by the technique used to manufacture the topographical features and/or the substrate itself and therefore embossing etching, molding, ablating, stamping from a master, and the like are all equivalent for purposes of defining the invention. The term "substrate" should be understood to include both monolithic and compound (e.g., layered) objects. Similarly, a substrate may be either rigid or flexible.

References to detecting local aerodynamic boundary conditions include detecting such conditions themselves, as well as changes in the same, and vice versa. It is also within the scope of the invention to detect any physical effect (or a change in the same) and convert it into an alternative value. Such conversions may be performed in analog or digital forms, in hardware and/or software, all without reducing the scope of the invention.

Figure 6:
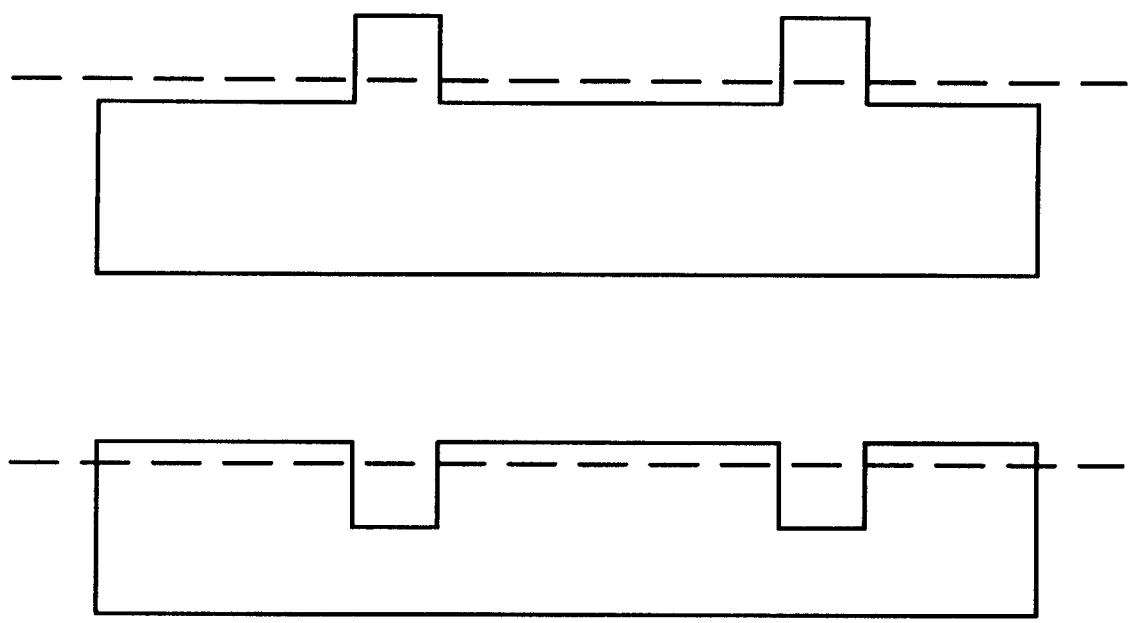
FIG. 6 is a schematic view of a patterned medium.

With respect to topographical features, "above" and "below" a substrate surface may be understood with respect to an average thickness of a substrate along with the relative breadth of the features vis-à-vis the regions between the features, all as illustrated in FIG. 6. Some features have average breadth less than the average distance between themselves; and if the average thickness (dashed line) lies above the region between such features, as in the upper portion of the Figure, then any topographic feature lying above that plane is understood to be a "bump" (or similar term) above the surface of the substrate. Conversely, if the average thickness (dashed line) lies below the region between such features, as in the lower portion of the Figure, then any topographic feature lying below that plane is understood to be a "pit" (or similar term) below the surface of the substrate.

What is claimed is:

1. A magnetic recording medium, comprising:
   a) a substrate having topographical features that extend above a surface of the substrate to readably affect a local aerodynamic boundary condition,
   wherein the features extend above the surface to a height that is greater than or equal to approximately five nanometers and less than or equal to approximately one hundred nanometers and
   wherein en arrangement of the features on the substrate defines a data signal; and
   b) a magnetic recording layer substantially conforming to the topographical features.

2. The medium of claim 1, wherein the features extend above the surface to a height that is less than or equal to approximately fifty nanometers.

3. The medium of claim 1, wherein the medium stores data as magnetization patterns within the magnetic recording layer.

4. The medium of claim 1, in which the topographical features lie below a height at which a magnetic transducer may travel over, and magnetically interact with, the magnetic recording layer.

5. The medium of claim 1, in which the local aerodynamic boundary condition affects temperature.

6. The medium of claim 1, in which the local aerodynamic boundary condition affects pressure.

7. The medium of claim 1, wherein the magnetic recording layer is continuous over a plurality of the features.

8. A magnetic recording medium comprising:
a) a substrate having topographical features that extend below a surface of the substrate to readably effect a local aerodynamic boundary condition,
wherein the features extend below the surface to a depth that is greater than or equal to approximately twenty nanometers and less than or equal to approximately one hundred and fifty nanometers, and
wherein an arrangement of the features on the substrate defines a data signal; and
b) a magnetic recording layer substantially conforming to the topographical features.

9. The medium of claim 8, wherein the medium stores data as magnetization on patterns within the magnetic recording layer.

10. The medium of claim 8, wherein the magnetic recording layer is continuous over a plurality of the features.

* * * * *

UNITED STATES PATENT AND TRADEMARK OFFICE
CERTIFICATE OF CORRECTION

PATENT NO. : 6,751,060 B2
DATED : June 15, 2004
INVENTOR(S) : Garry R. Lundstrom It is certified that error appears in the above-identified patent and that said Letters Patent is hereby corrected as shown below:

Column 6,
Line 46, "nanometers and" should read -- nanometers, and --.
Line 47, "en" should read -- an --.

Column 8,
Line 4, "magnetization on patterns" should read -- magnetization patterns --

Signed and Sealed this

Fifth Day of October, 2004

JON W. DUDAS
*Director of the United States Patent and Trademark Office*